United States Patent Office.

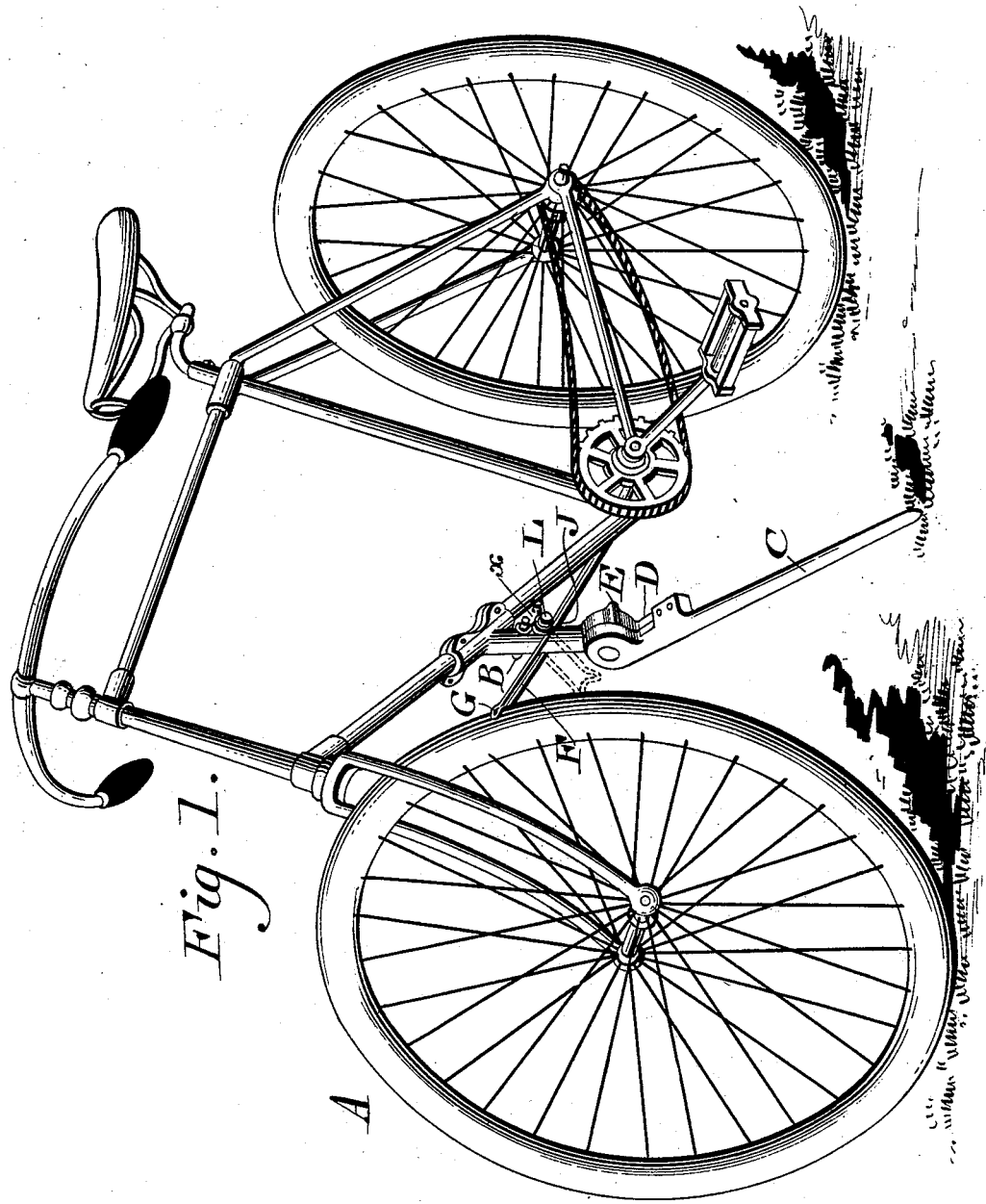

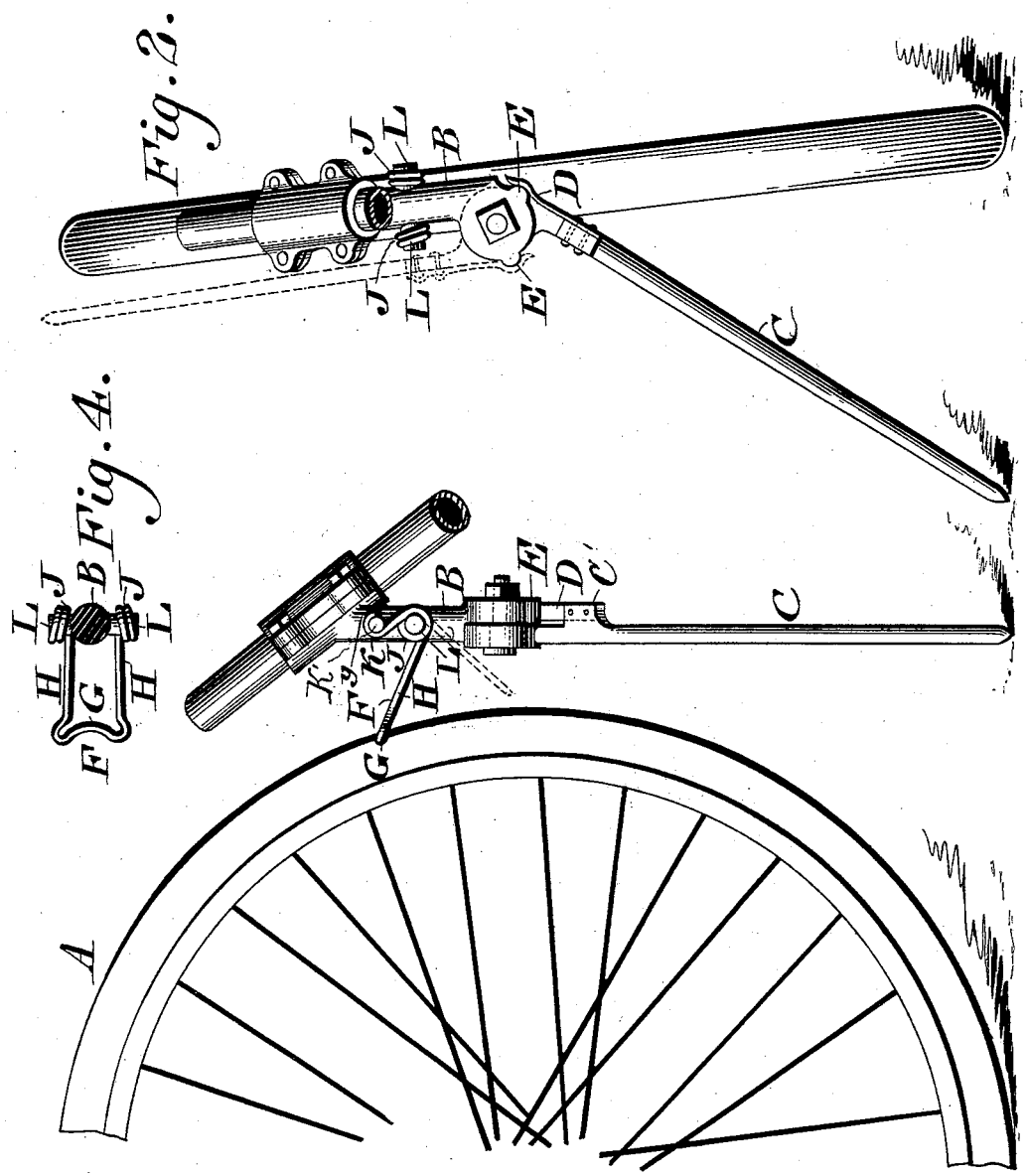

JOSEPH M. BELL, OF SOUTH CHESTER, PENNSYLVANIA.

BICYCLE.

SPECIFICATION forming part of Letters Patent No. 537,265, dated April 9, 1895.

Application filed May 4, 1893. Serial No. 472,936. (No model.)

*To all whom it may concern:*

Be it known that I, JOSEPH M. BELL, a citizen of the United States, residing at South Chester, in the county of Delaware, State of Pennsylvania, have invented a new and useful Improvement in Bicycles, which improvement is fully set forth in the following specification and accompanying drawings.

My invention relates to improvements in bicycles and consists of a novel lock for preventing motion of the driving wheel thereof.

Figure 1 represents a perspective view of a bicycle having a lock embodying my invention. Fig. 2 represents a partial end view and partial vertical section on line $x$, $x$, Fig. 1. Fig. 3 represents a side elevation at a right angle to Fig. 2. Fig. 4 represents a horizontal section of a portion on line $y$, $y$, Fig. 3.

Similar letters of reference indicate corresponding parts in the several figures.

Referring to the drawings, A designates a bicycle, which excepting the features of my invention applied thereto is of usual construction.

To a proper part of the frame of the bicycle, preferably at the rear of the front wheel, is secured a bearing piece or arm B, and to a head on the same is pivoted a prop or leg C, which is adapted to rest on the ground for the purpose of supporting the bicycle. To an ear C' on the side of said prop is attached a spring plate D, which is adapted to ride over the adjacent portion or head of the arm B, and engage with either of the projections E thereon, said projections being separated at a distance equal to the position to be occupied by the prop C in operative or inoperative positions.

Connected with the arm B is a lock F, which is adapted to engage with the tire of the steering wheel, said lock in the present case, consisting of a shoe G, supports H therefor, eyes J, and fastening ends K, formed of a continuous piece of wire, the eyes J being mounted on gudgeons L, on the arm B, and forming a spring for the brake. The fastening ends K are adapted to be secured to gudgeons K' on the arm B, when the shoe is in contact with the wire. It will be seen that when the prop is lowered, and the bicycle sufficiently tilted, as shown in Fig. 2, as the prop engages with the ground, the prop and wheel form a base, whereby the bicycle is sustained in vertical position and prevented from overturning. The arm and prop are pivoted together by a bolt which passes through heads on said parts, which are placed alongside of each other, and the ear C on the prop projects laterally from the same, so that the catch secured thereto rests upon and is adapted to ride over the head of the arm. As the steering or front wheel may have a tendency to move or swivel creep, the same is turned slightly so as to permit the lock to be raised, after which the wheel is restored to its former position, when the lock lowers or is lowered upon said wheel, thus controlling the same. The normal position of the lock is shown in dotted lines Figs. 1 and 3, where it does not interfere with the rotation of the wheel, or operation of the bicycle.

The prop may be swung up or raised and placed in vertical and inoperative position, and held thereat by the catch D, as will be seen by the dotted lines Fig. 2.

If desired, the lock may be connected with the prop C, and so disposed thereon that it may be engaged with and disengaged from the steering wheel.

If desired, projections E may be formed on the catch D, and recesses made in the bearing piece B, said projections being adapted to drop into said recesses, and thus hold the prop in either of its positions.

Having thus described my invention, what I claim as new, and desire to secure by Letters Patent, is—

1. A bicycle lock formed of an engaging part, supports therefor and elastic eyes on said supports, said eyes being adapted to be mounted on gudgeons of the bicycle and forming the spring of the lock, said parts being combined substantially as described.

2. A bicycle lock formed of an engaging part, supports therefor, spring eyes on said supports and fastening ends on said supports, the parts named being formed of a continuous piece of material, such as heavy wire, substantially as described.

JOSEPH M. BELL.

Witnesses:
JOHN A. WIEDERSHEIM,
R. H. GRAESER.